United States Patent
Gerszberg et al.

(10) Patent No.: US 7,145,440 B2
(45) Date of Patent: Dec. 5, 2006

(54) BROADBAND COUPLER TECHNIQUE FOR ELECTRICAL CONNECTION TO POWER LINES

(75) Inventors: Irwin Gerszberg, Kendall Park, NJ (US); Paul Shala Henry, Holmdel, NJ (US)

(73) Assignee: AT&T Corp., New York, NY (US)

( * ) Notice: Subject to any disclaimer, the term of this patent is extended or adjusted under 35 U.S.C. 154(b) by 227 days.

(21) Appl. No.: 10/963,144

(22) Filed: Oct. 12, 2004

(65) Prior Publication Data

US 2006/0082219 A1    Apr. 20, 2006

(51) Int. Cl.
    *H04M 11/04*      (2006.01)
(52) U.S. Cl. .......................... 340/310.01; 340/310.06; 340/310.07; 340/310.11; 340/538.17; 340/870.02; 375/219; 375/220; 439/676
(58) Field of Classification Search ........... 340/310.01, 340/310.06, 310.07, 310.11, 538.17, 870.02; 375/219, 220; 439/676
See application file for complete search history.

(56) References Cited

U.S. PATENT DOCUMENTS

| | | | |
|---|---|---|---|
| 4,739,448 | A | 4/1988 | Rowe et al. |
| 6,407,987 | B1 * | 6/2002 | Abraham ............... 370/295 |
| 6,624,532 | B1 | 9/2003 | Davidow et al. |
| 7,078,996 | B1 * | 7/2006 | Cern et al. ............ 336/175 |
| 2002/0031226 | A1 | 3/2002 | Simonsen et al. |
| 2002/0136394 | A1 | 9/2002 | Snow et al. |
| 2003/0048152 | A1 | 3/2003 | Brown et al. |
| 2003/0190110 | A1 | 10/2003 | Kline |
| 2003/0222747 | A1 | 12/2003 | Perkinson et al. |
| 2003/0234713 | A1 | 12/2003 | Pridmore, Jr. |
| 2004/0018775 | A1 * | 1/2004 | Mazzullo et al. ......... 439/676 |
| 2004/0056734 | A1 | 3/2004 | Davidow |
| 2004/0142599 | A1 | 7/2004 | Cope et al. |

* cited by examiner

*Primary Examiner*—Tai Nguyen

(57) ABSTRACT

Disclosed is a power line broadband communication system having broadband coupler devices capable of direct electrical connection to an energized power line. The coupler includes a conductive portion movable by an adjustable member from a non-conducting retracted position spaced apart from the power transmission line to a forward conducting position in electrical contact with the power line. An insulated arm supports the coupler on the power line. A base on the coupler is engageable with a remotely activated tool in order to accomplish the electrical connection in a safe and secure manner. Broadband data signals are sent to and from customer premises along the shared energized power lines. New coupler connections to the energized power lines allow the additional broadband customers and/or repeaters to join the communication system. Also couplers may provide connections to control electronics, routers, wireless transceivers, and may allow the broadband signals to bypass transformers on the power lines. The invention helps to minimize risk by allowing an installer to be remotely spaced from the energized power line while making the electrical coupling contact with the energized power line.

34 Claims, 8 Drawing Sheets

BROADBAND COUPLER TECHNIQUE FOR ELECTRICAL CONNECTION TO POWER LINES

BACKGROUND OF THE INVENTION

This application relates generally to data transmission, and more particularly to data transmission over power lines.

The use of power lines to transmit data is known. Initially, power line communication systems were limited to relatively low data rates, typically less than 500 kbs. These low data rates are generally useful for applications such as remote control of various switches connected to the power line system. More recently, developments have been made in the area of broadband power line communication systems, also known as power line telecommunications (PLT) systems or broadband power line (BPL) systems. These systems are capable of transmitting data at significantly higher data rates than previous systems. For example, BPL systems can transmit data at rates of 4–20 Mbps.

While existing power line systems are capable of transmitting data at the rates described above, they were not initially designed for data transmission. Instead, they were designed to carry large currents at high voltages so that significant amounts of energy could be distributed at one primary low frequency (e.g., 60 Hertz).

Power line communication systems generally use one or more carrier frequencies in order to spread the data transmission over a wider range of frequencies. The low data rate power line communication systems discussed above generally utilized frequencies in the range of 9 kHz to 525 kHz. In this frequency range the risk of emissions is low as the attenuation of the cable is low and the wavelengths used in the signaling are long with respect to the typical cable lengths in the system. However, the high data rates of BPL systems cannot be achieved using carrier frequencies below 525 kHz. Instead, BPL systems typically use carrier frequencies in the range of 1–30 MHz. At these higher frequencies, it is preferable to employ capacitive coupling rather than inductive coupling in order to implement a broadband communication system using power line cables.

Providing an electrical coupling to medium voltage (MV) and low voltage (LV) power lines as part of a broadband communication system is a dangerous task. Also the coupling must be made secure to withstand hostile weather conditions and to provide reliable communication services. Previous attempts to install such a coupling as part of a capacitive coupling circuit have relied on highly trained and skilled installation personnel. New customer interconnections as well as periodic interconnections with auxiliary electronics such as repeaters, routers, etc. must be done at various points along energized power lines without incurring risk of injury or disruption of both power transmission and broadband communications. There is an important need to develop a technique for providing such interconnections at a safe distance spaced from the energized power lines.

BRIEF SUMMARY OF THE INVENTION

The invention provides a power line broadband communication system having broadband coupler devices capable of direct electrical connection to an energized power line without creating unreasonable safety risks.

Various embodiments of the invention include a conductive portion movable from a non-conducting retracted position spaced apart from the power transmission line to a forward conducting position in electrical contact with the power line. An insulated arm supports the coupler on the power line. In some embodiments a base of an adjustable member on the coupler is engageable with a remotely activated tool in order to accomplish the electrical connection in a safe and secure manner.

Generally speaking the invention enables broadband data signals to be sent to and from existing and new customer premises along the shared energized power lines. New coupler connections to the energized power lines allow additional broadband customers to join the communication system. Also couplers may provide power line connections to other components such as to repeater control electronics for the broadband signals, to signal routers, and to transformer bypass circuits.

In accordance with some embodiments of the invention, a method for facilitating broadband electrical transmissions on a power line includes placing a coupler device on an energized power line in a self-supporting position, engaging the coupler device from a location spaced apart from the energized power line to cause a conductive portion of the coupler device to make electrical metallic contact with the power line, and transmitting data signals through the coupler device via the energized power line.

In one embodiment the coupler device carries signals to and from transceivers associated with customer premises. Such transceivers may have wired connections via transformer bypass router lines to and from customer premises. Other exemplary transceivers may be wireless transceivers that eliminate any need for a transformer bypass line.

In other embodiments the coupler device may provide a direct connection to energized power lines from electronic signal control devices. Signal repeaters are an example of such devices that can be connected to an MV line through a coupler installation device incorporating features of the invention.

Exemplary coupler device embodiments may include a hanger fixture having a first insulated end capable of self-supporting contact with a power line cable, and a second conductive end adjustably movable relative to the power line cable. Secure attachment may be accomplished after electrical contact has been made between the conductive end and the power line cable by a compressive force exerted by an adjustment bolt or screw holding the power line cable between the first and second ends of the hanger fixture.

In some embodiments the first end of the coupler device includes a U-shaped portion for partially surrounding the power line cable, and the adjustment bolt or screw may be incorporated as part of the second conductive end of the fixture and may have a sharp edge or point for making metallic electrical contact with the power line cable. In some embodiments the adjustment bolt or screw may cause closure of the coupler device to prevent the coupler from becoming disengaged from the power line cable.

One aspect of the invention includes moving the conductive portion from the retracted position with an insulated tool that is activated remotely to engage an adjustment portion of the coupler.

In some embodiments, the conductive portion of the coupler is connected to a broadband signal line through a capacitor. The technique of the present invention as implemented in certain embodiments helps to make capacitive coupling cost competitive with inductive coupling, thereby taking advantage of the fact that capacitive coupling is more efficient for broadband signals. The impedance of a capacitive coupler (i.e., its ability to obstruct the flow of signal energy) decrease with signal frequency. With an inductive coupler, the impedance increase with frequency. Thus the capacitive coupler is better suited to cases where we want to use high-frequency broadband signals.

Because a capacitive coupler device requires direct electric conductive contact with an energized power line, the coupler installation device and method of the present invention greatly facilitate the capability of enjoying the benefits of capacitive coupling for broadband power line communication systems as compared with inductive coupling.

These and other advantages of the invention will be apparent to those of ordinary skill in the art by reference to the following detailed description and the accompanying drawings.

DETAILED DESCRIPTION

Figure 1:
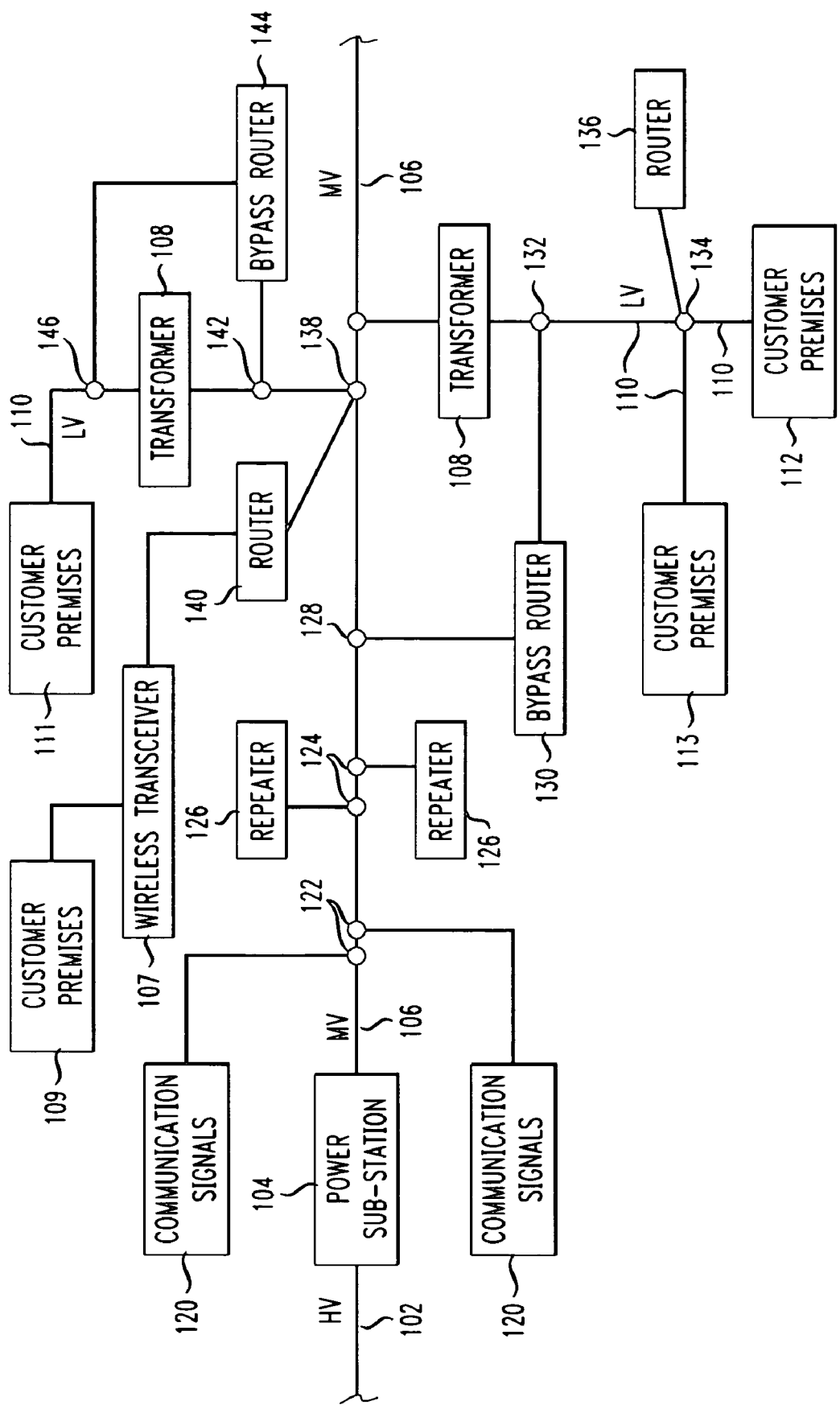
FIG. 1 shows a broadband power line communication system for implementing various features of the invention.

A typical power line communication system for implementing features of the invention is shown in FIG. 1. A high voltage (HV) power line 102 transmits power through sub-station 104 to a medium voltage (MV) power line 106 that eventually may connect through a transformer 108 to low voltage (LV) lines 110 that provide alternating electrical power to customer premises 111, 112, 113. A wireless connection through transceiver 107 may provide an alternative connection to customer premises 109.

A head end data network provides communication signals 120 via a fiber optic cable or other suitable transmission links to the end user customer premises 111, 112, 113 using power line cables as the transmission medium. Techniques for converting data signals to the electrical domain for transmission via the power lines are well known. A transmitter contains a modulator which modulates the incoming data onto a carrier signal using well known RF modulation techniques. As described above, typical carrier frequencies for a power line communication system are in the range of 1–30 MHz. The modulated signal is provided to the power line cable 106 via couplers 122.

It will be understood by those skilled in the art that a signal on an optical cable must first be converted to an electrical signal, then reformatted (demodulated-remodulated) to a format appropriate for transmission on a power line (e.g., OFDM). Such a modulated and reformatted signal can then be coupled by the present invention onto a power line as shown at coupler connections 122.

A power line communication system of the type shown in FIG. 1 may use orthogonal frequency division multiplexing (OFDM) in which the available bandwidth is split up into multiple narrowband channels which do not interfere with each other. However the present invention is applicable to any type of power line communication system such as OFDM, a spread-spectrum system, etc. Thus, in accordance with any appropriate BPL system, broadband signals are carried over the MV line 106 and optionally LV lines 110 to receivers at the customer premises 111, 112, 113, or via MV line 106 through wireless transceiver 107 to customer premises 109.

For purposes of the present description, it is assumed that the MV power line cable 106 will typically supply power at 4–66 kV. Such medium voltage cable is typically an aluminum cable having a 1 cm diameter. Couplers 122 provide an interconnection for the modulated carrier signal to the MV line 106. Various types of couplers are known in the art, including for example inductive couplers and capacitive couplers. The carrier signal is transmitted along the length of MV power line cable 106 through transformers 108 to LV lines 110. The low voltage power line typically supplies power at 100–240 volts. The low voltage line transmits the data signals to the customer premises 111, 112, 113 where a modem demodulates the signal and extracts the data message.

It is noted that for ease of description only downstream (i.e., from head end to end user) data transmission is shown and described. One skilled in the art would readily recognize that upstream transmission could be accomplished in a similar manner.

As described above in the background section, there is a significant problem with safety risks in providing broadband coupler connections directly to an energized power line.

As shown in the embodiment of FIG. 1, the MV line 106 may connect through MV couplers 124 to signal repeater electronics 126. Providing a repeater connection to a MV power line is an important application in some embodiments of the invention.

The MV line 106 may also connect through MV coupler 128 via bypass router 130 to LV coupler 132 in order to achieve data signal transfer to an LV power line 110. Router 136 interconnects with LV power line 110 at LV coupler 134 in order to selectively deliver appropriately addressed data signals to receivers at either customer premises 112 or customer premises 113. The coupler installation of the invention can be incorporated at high risk MV coupler connection 128, and also at lower risk LV coupler connections 132, 134, although installation at these LV points does not pose the high safety risk associated with installation on MV lines The MV line 106 may also connect through MV coupler 142 via bypass router 144 to LV coupler 146 in order to achieve data signal transfer to an LV power line 110. Router 140 interconnects with MV power line 106 at MV coupler 138 in order to selectively deliver appropriately addressed data signals via wireless transceiver 107 to customer premises 109. Using such a wireless transceiver, as for example a WiFi access point, makes it unnecessary to provide a transformer bypass path for the broadband signal. The coupler installation of the invention can be incorporated at high risk MV coupler connections 138, 142, and also at lower risk LV coupler connection 146.

Figure 2:
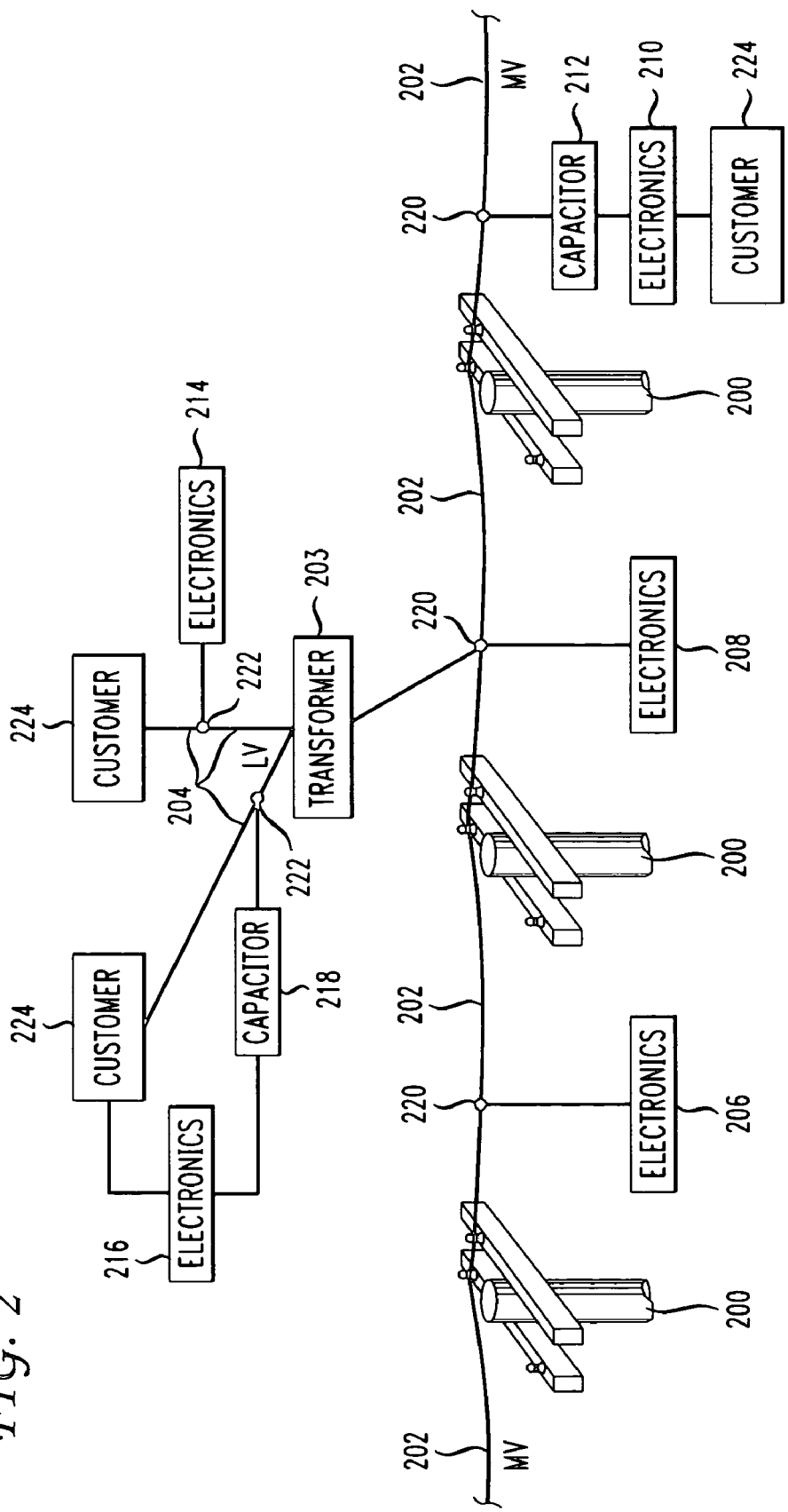
FIG. 2 is a schematic illustration showing an exemplary power line communication system embodiment of the invention.

FIG. 2 is a high level schematic diagram showing exemplary locations for installing a coupler device on a power line communication system. Although most present day power lines transmit alternating current (AC), the invention is applicable to both AC and DC (direct current) power line systems. Utility poles 220 support MV lines 202 and LV lines 204 at a safe distance from the ground. Implementing a communication system on the power lines typically requires electronic components 206, 208, 210, 214, 216 including capacitors 212, 218 in order to assure satisfactory transmission of broadband signals to customers 224. The invention provides a safe, secure and reliable coupling technique for making electrical interconnections to high risk MV lines at coupling locations 220, as well as to lower risk LV lines at coupling locations 222.

Figure 3:
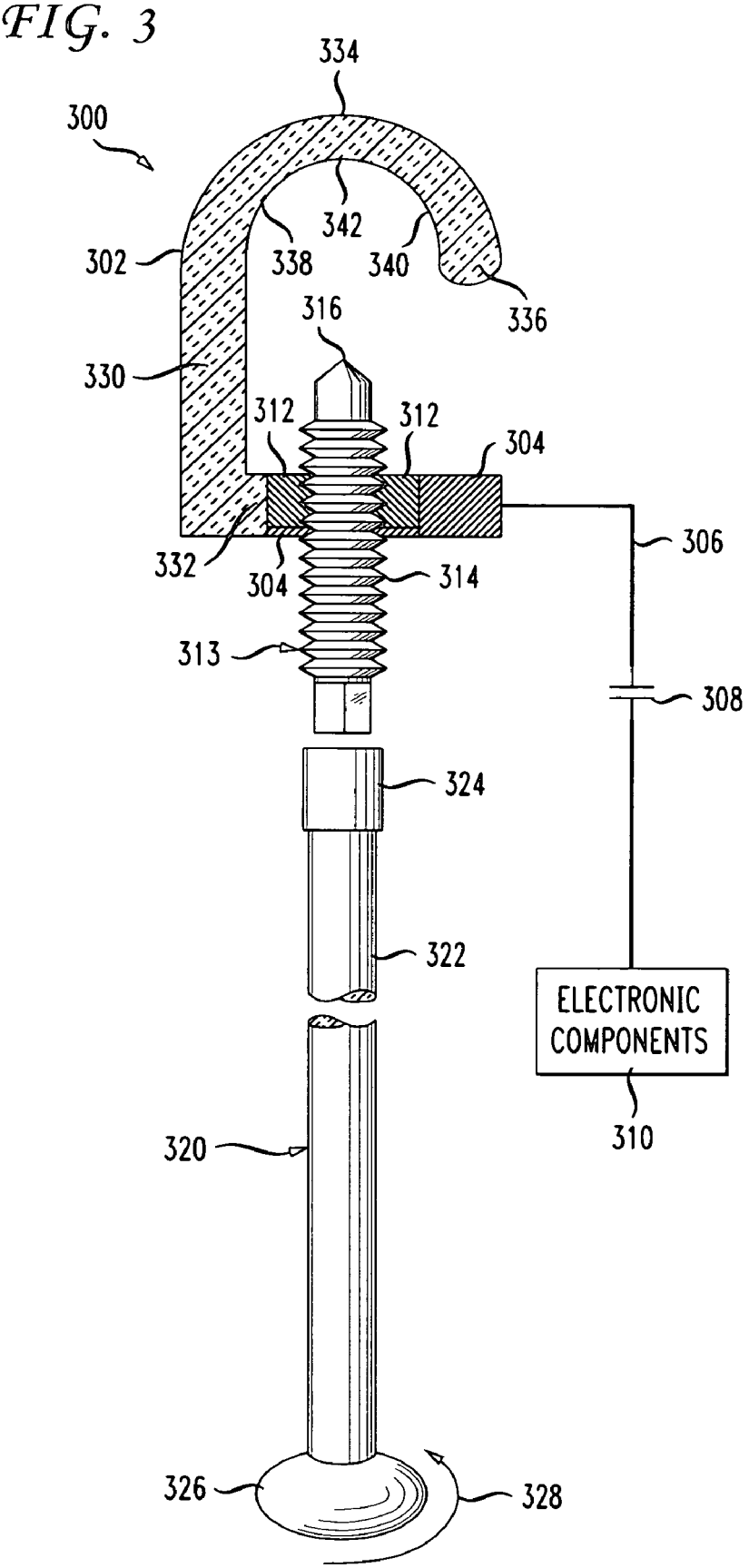
FIG. 3 shows an exemplary embodiment of a coupling device for connection to a power line communication system.

The embodiment of FIG. 3 shows an exemplary coupler device 300 having an insulated portion 302 and a conductive portion 304 connected through link 306 via capacitor 308 to electronic components 310. A threaded sleeve 312 receives a conductive adjustment screw 313 with threads 314. The adjustment screw 313 has a contact point 316 for electrical contact with a power line cable (not shown). An insulated tool 320, as for example a tool known in the trade as a hotstick, includes a long extension 322 having a cap 324 sized and shaped for engagement with the adjustment screw 313. An installer can grasp a handle 326 at a location remote from high risk MV or lower risk LV power cables and actuate the tool such as by rotation in direction 328.

The insulated portion 302 of the coupler 300 may have a hook-shaped end 334 formed by extension 330 and truncated end 336. A leg portion 332 provides an attachment junction with the conductive portion 304. The overall contours of the insulated portion 302 may be U-shaped in order to provide multiple interior contact surfaces 338, 340, 324 for contacting adjacent surfaces of a power line cable in order to support the coupler when the adjustment screw 313 is in open position, as well as to securely establish electrical contact and maintain attachment to the power cable when the adjustment screw 313 is in closed position. Other hook-like shapes may be incorporated in the insulated portion 302 in order to partially surround the power cable and maintain the coupler 300 in self-supporting position during initial coupler installation as well as during actuation of the tool to accomplish electrical contact between the conductive portion 304 and the energized power cable.

Of course, the benefits of the invention can be achieved with other adjustment members which perform a similar function to the adjustment screw 313 so that the coupler can have a conductive component remotely actuated from a retracted position to a forward conducting position while the coupler remains in self-supporting position on the power cable.

Figure 4A:
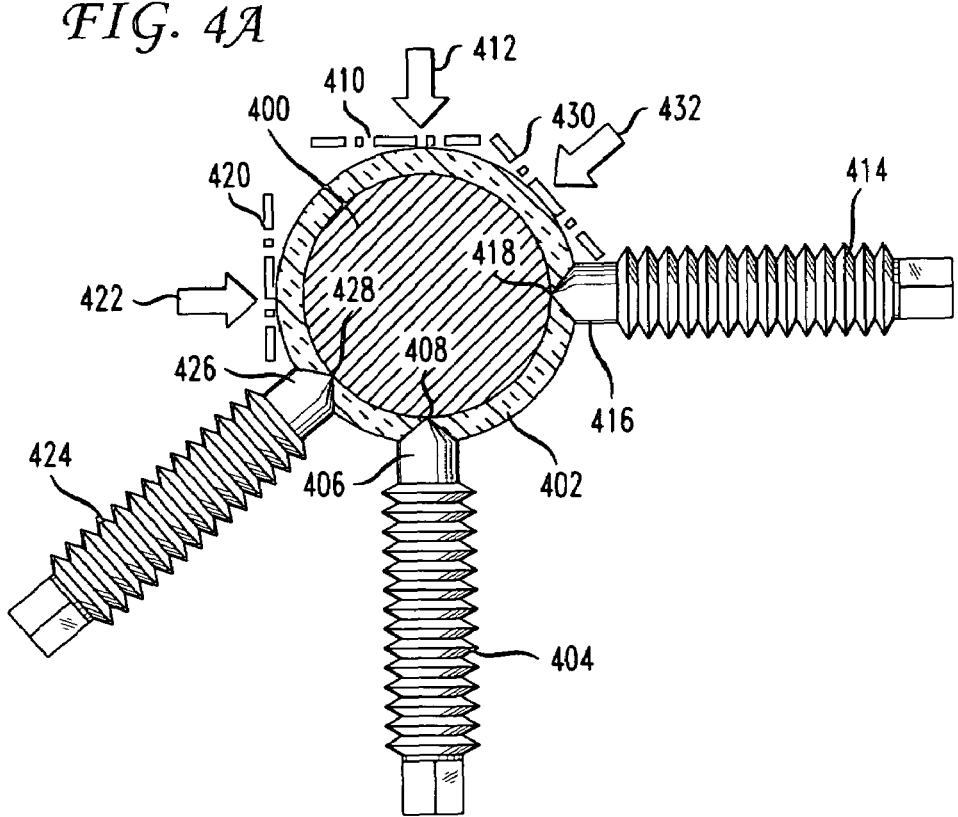
FIGS. 4A and 4B show exemplary techniques for using features of the invention to make an electrical connection at different angular orientations directly to an energized communication power line.

It will be understood by those skilled in the art that various angular orientations of a coupler fixture and its conductive element relative to a power line cable are possible in order to achieve the goals of the present invention. For example, in FIG. 4A, a conductive adjustment screw 404 has a tapered head 406 with a central contact point 408 and is shown facing upwardly in a vertical direction for making electrical contact with power cable 400. A coupler having contact surfaces approximately coincident with plane 410 will apply compressive forces in a direction 412 in order to help maintain such electrical contact and hold the coupler in secure position on the power cable. A conductive adjustment screw 414 has a tapered head 416 with a central contact point 418 and is shown facing laterally in a horizontal direction for making electrical contact with power cable 400. A coupler having contact surfaces approximately coincident with plane 420 will apply compressive forces in a direction 422 in order to help maintain such electrical contact and hold the coupler in secure position on the power cable. A conductive adjustment screw 424 has a tapered head 426 with a central contact point 428 and is shown facing partially upwardly in a somewhat oblique angular direction for making electrical contact with power cable 400. A coupler having contact surfaces approximately coincident with plane 430 will apply compressive forces in a direction 432 in order to help maintain such electrical contact and hold the coupler in secure position on the power cable.

Figure 4B:
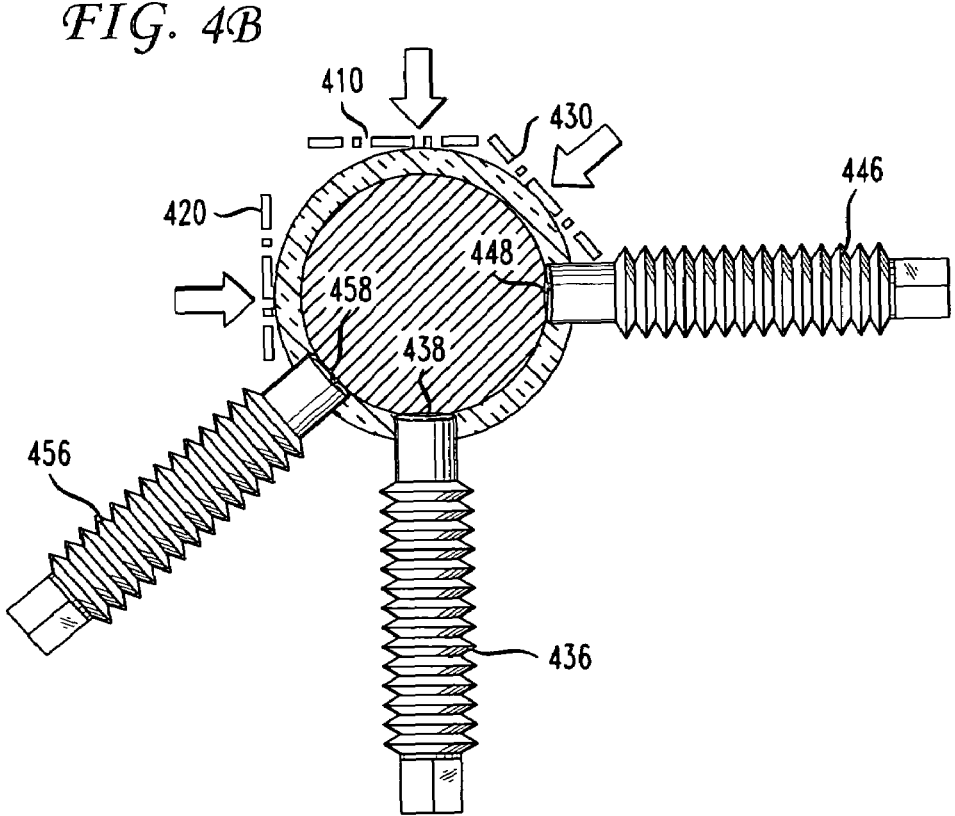

Similar orientations are illustrated in FIG. 4B for non-tapered heads respectively having sharp peripheral edge contact surfaces 438, 448, 458. Compressive forces applied perpendicular to planes 410, 420, 430 will maintain electrical contact with adjustment screws 436, 446, 456 respectively, and hold the coupler in secure position on the power cable.

Figure 5A:
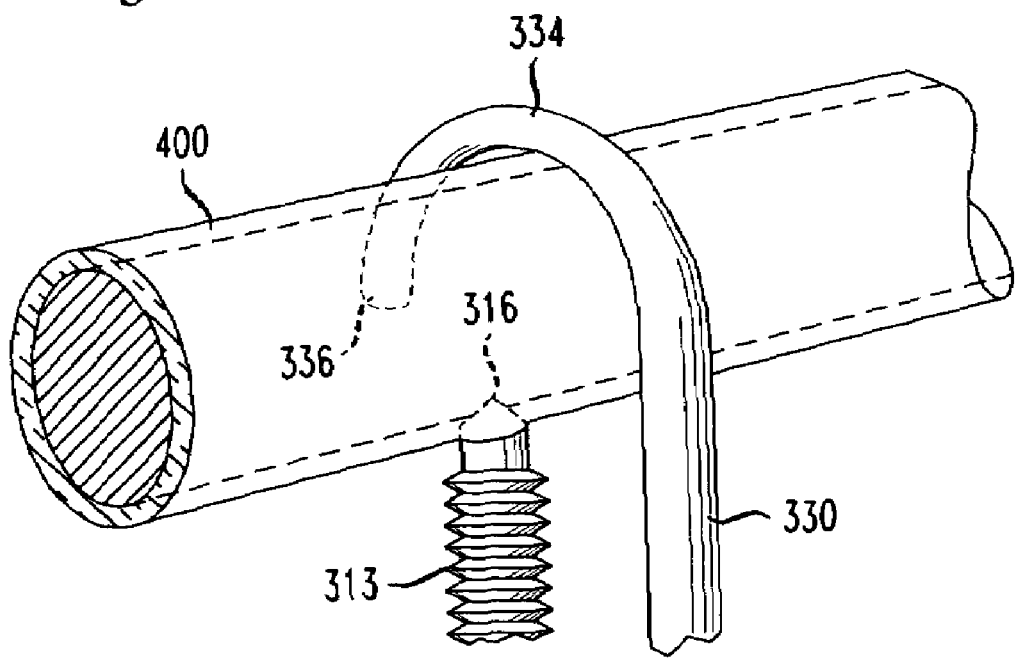
FIGS. 5A and 5B show additional exemplary techniques for using a coupling device to make an electrical connection directly to an energized communication power line.
Figure 5B:
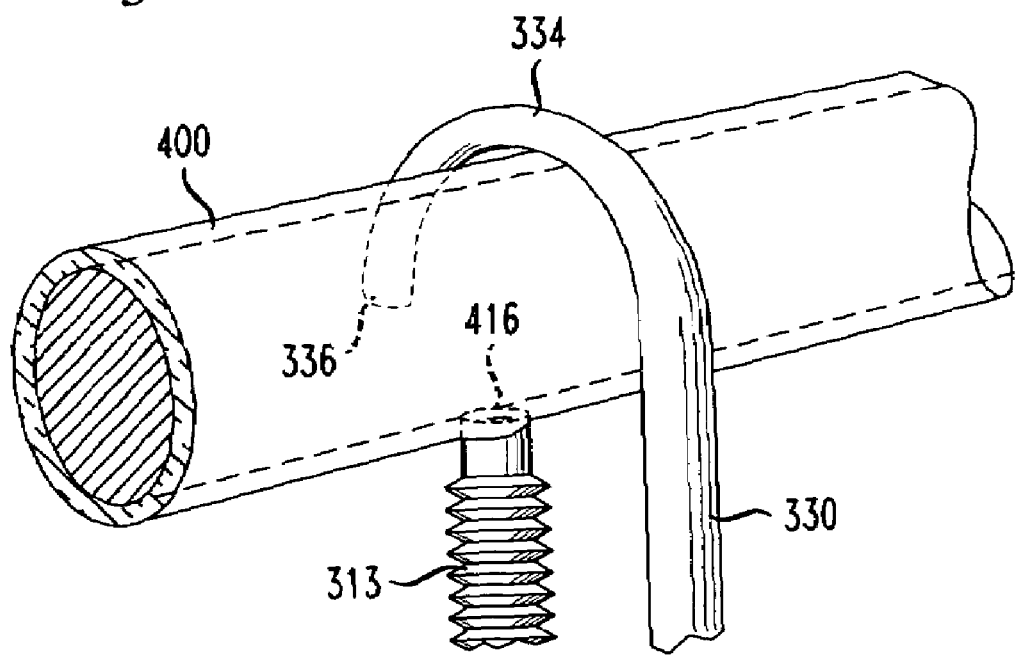

Referring to FIGS. 5A and 5B, a coupler device is shown in closed position with a conductive portion in electric metallic contact with a power line cable 400. In these embodiments, a U-shaped insulated coupler arm 334 includes an elongated extension 330 and a shortened extension such as truncated end 336. An adjustment shaft in the form shown as threaded adjustment screw 313 makes electrical contact and also applies compressive forces to hold the power line cable 400 in secure position against the U-shaped insulated coupler arm 334.

In FIG. 5A a central contact point 316 on the apex of the adjustment screw 313 makes the electrical contact. In FIG. 5B a sharpened circular peripheral edge 416 on the apex of the adjustment screw 31 makes the electrical contact. Various other shapes and type of sharp contact edges or points may be used in order to penetrate any weather coating or other surface material on the power line cable and make the appropriate metallic contact for transmitting message and control signals between the coupler and the power line cable.

Figure 6A:
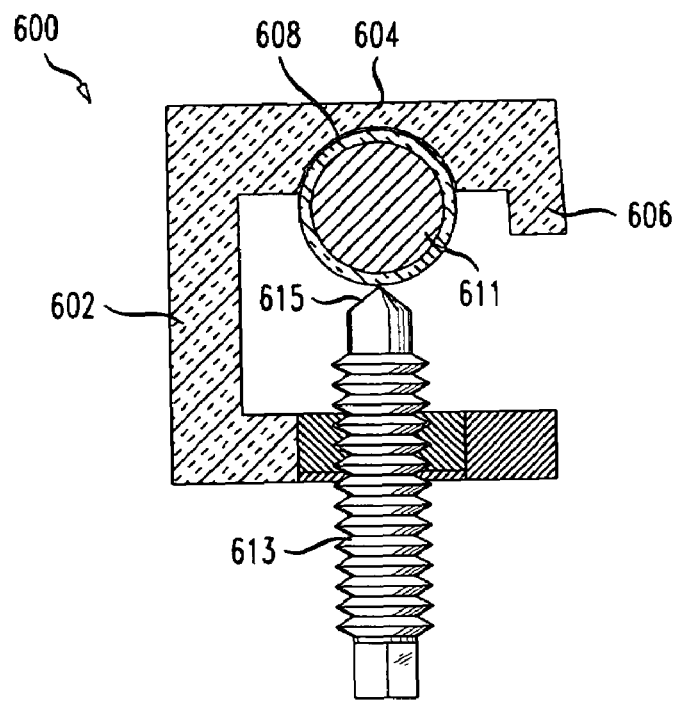
FIGS. 6A and 6B show fragmentary views of other coupling device embodiments that facilitate electrical connections to an energized communication power line.
Figure 6B:
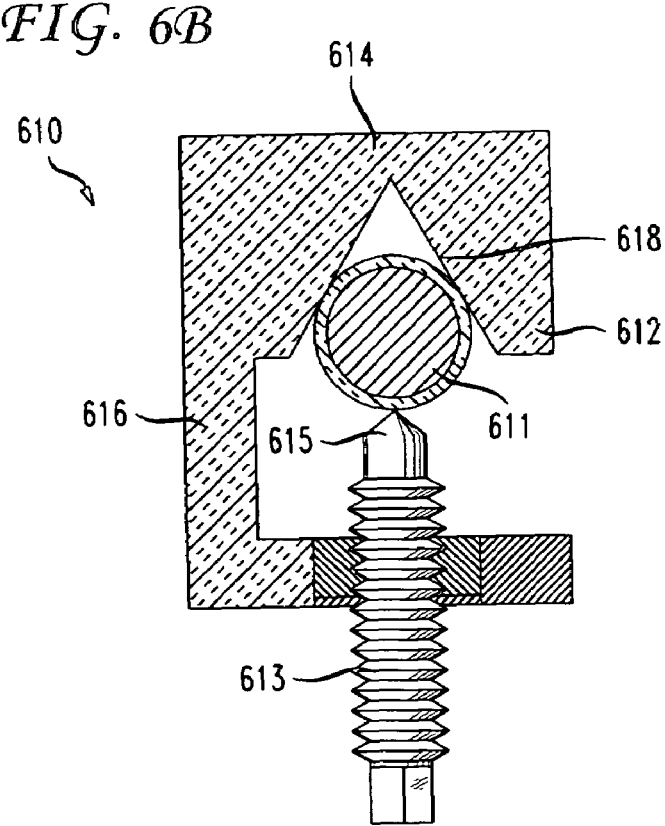

Additional embodiments for facilitating engagement of a self-supported coupling device on a power line are shown in FIGS. 6A and 6B. Referring to FIG. 6A, an insulated arm 600 includes elongated extension 602, header 604 and shortened extension 606 which together form a rectangular-shaped hook having a central concave recess 608 shaped and sized to provide support on a power line cable 611. A threaded conductor shaft 613 is shown in partially closed position with its tapered head 615 starting to penetrate an outer insulation layer prior to making electrical contact with the power line cable 611 (see FIG. 4A).

Referring to FIG. 6B, an insulated arm 610 includes shortened extension 612, header 614 and elongated extension 616 which together form a rectangular-shaped hook having a triangular slot 618 to provide support on a power line cable 611. The threaded conductor shaft 613 is shown in partially closed position similar to FIG. 6A.

Figure 7:
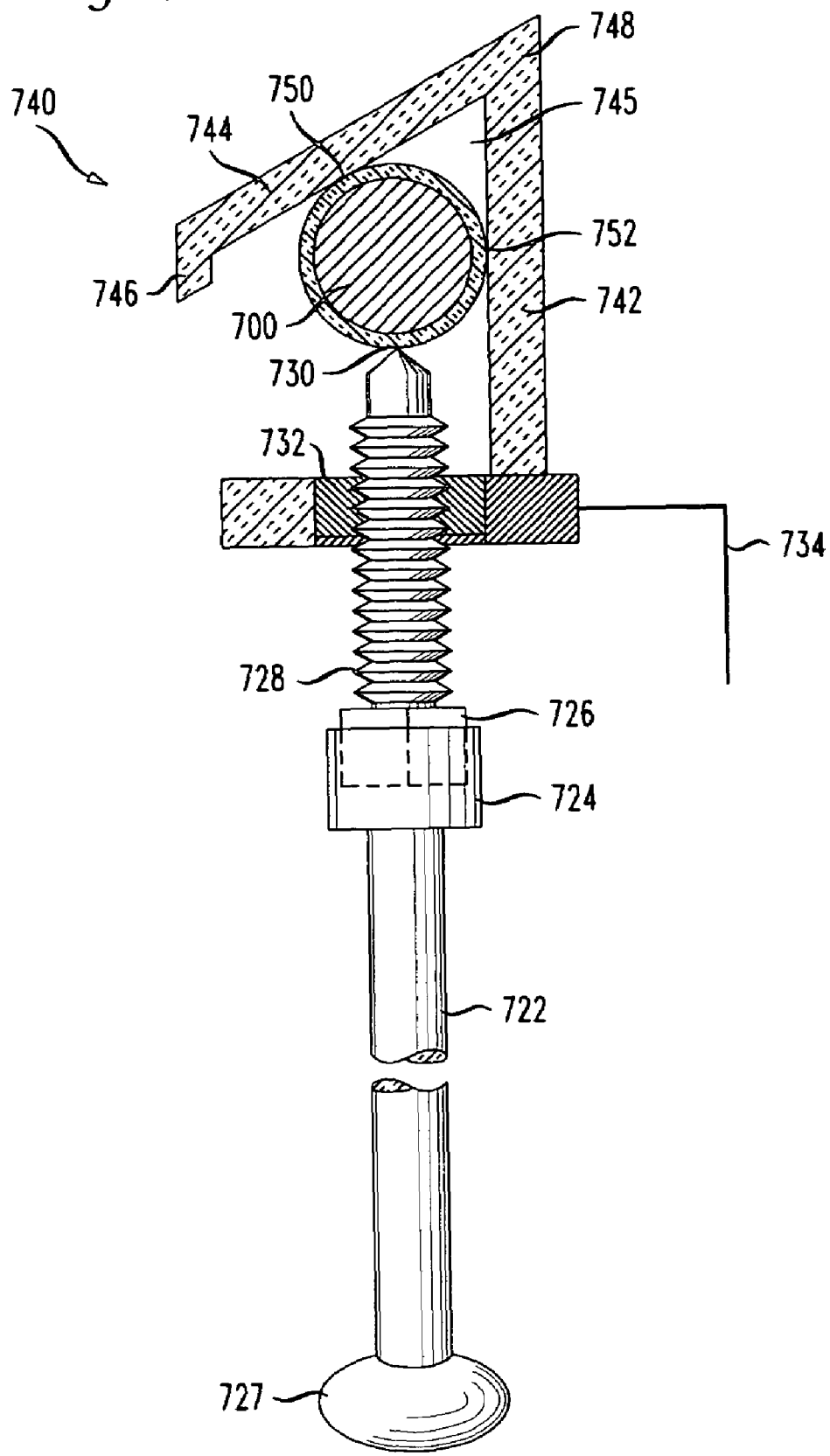
FIG. 7 shows a fragmentary view of another coupling device embodiment.

Referring to the embodiment of FIG. 7, a mechanical fixture assembly includes a coupler device 740 shown in a self-supporting position on a power line 700, and also includes a remotely activated insulated tool 722 that has been manually engaged with the coupler device 740. The insulated tool 722 has a cap 724 sized and shaped to fit an enlarged base 726 of a threaded shaft 728 on the coupler device 740. After an installer has manually rotated a handle 727 remotely located from the power line 700 in order to advance the threaded shaft 728 forwardly, a sharpened point 730 on an apex of the shaft advances from a partially closed position making initial contact with an insulation layer as shown in the drawing until the insulation layer is penetrated and electrical metallic contact is made directly with the power line (see FIG. 4A).

The threaded shaft and its adjacent threaded base 732 together constitute a conductor portion of the coupler device for carrying signals to and fro between line 734 and power line 700. In this embodiment, an insulated arm is formed by a first extension 742 connected at its lower end to the base 732, and is joined at its upper end 748 to angular extension 744 to form a triangular recess 745 for supporting the coupler device on the power line 700. A lower leg portion 746 on the angular extension 744 along with interior contact surfaces 750, 752 help to assure the coupler device 740 remains in self-supporting position on the power line 700 upon initial installation of the coupler device and during adjustment of threaded shaft 728 into conducting position by insulated tool 722.

In view of the foregoing description and drawings of exemplary embodiments, it will be understood by those skilled in the art that variously shaped coupler devices with differently shaped interior contact surfaces can be utilized in order to maintain the coupler device in a somewhat stable self-supporting position on a power cable during the various stages of installation. In some instances, the corresponding mass of each portion of the exemplary coupler devices shown in the various drawing figures may if necessary be counter-balanced in order to help the coupler device remain self-positioned, such as when an adjustment member such as a threaded shaft is in retracted open position as well as when an adjustment member is moved into closed position such as during rotation of the threaded shaft by the remotely positioned installer.

Figure 8:
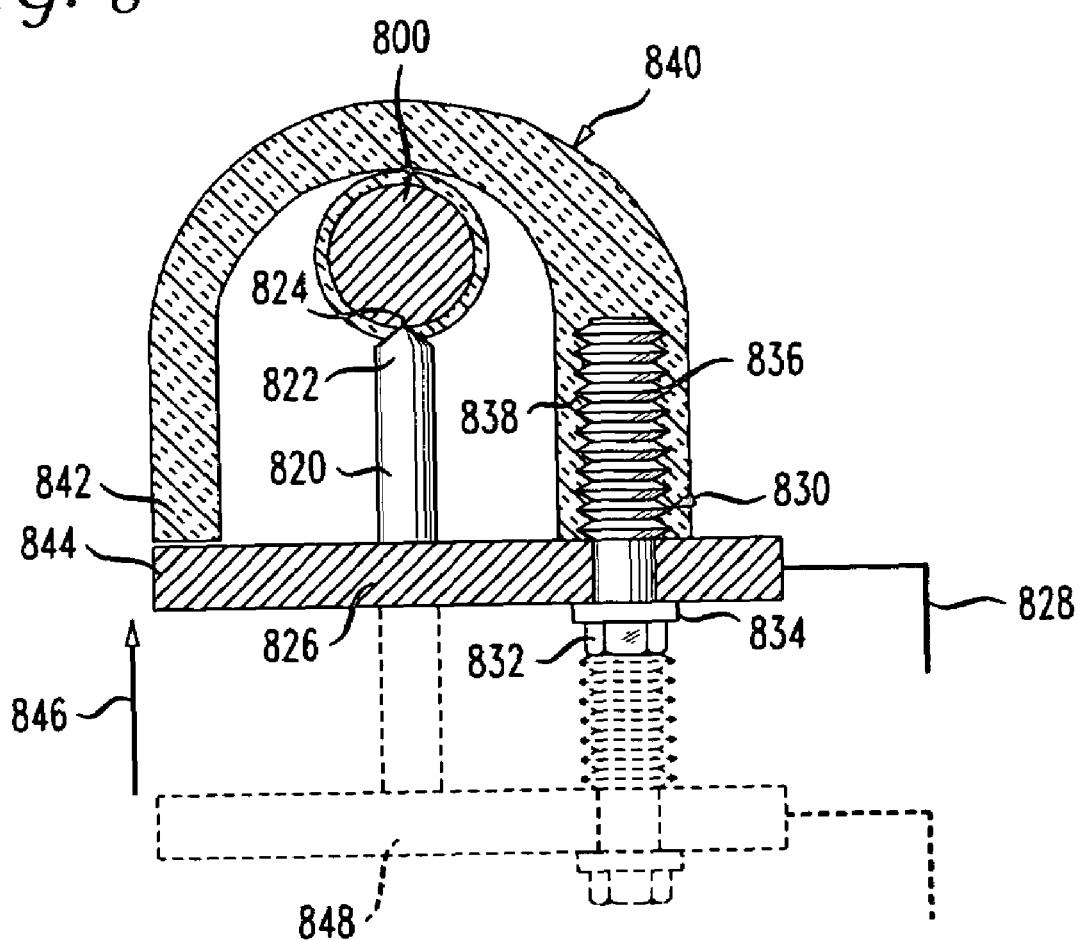
FIG. 8 shows a fragmentary view of a different coupling device embodiment in closed conductive position, with an open position of the coupling device shown in phantom.

Referring to the embodiment of FIG. 8, a power line 800 is shown in an engaged position with a closed fully installed coupler device 840 comprising another mechanical fixture. A conductor shaft 820 has an upper end 822 tapered to form a sharpened central point 824, the shaft being formed integral with a conductor plate 826 connected to signal line 828. A separate bolt 830 that may be formed with a dielectric material has a threaded upper end 836 that engages a matching threaded sleeve 838 on a U-shaped insulated arm 840. Rotation of the bolt by a remotely activated tool (not shown in this drawing) advances the conductor plate 826 and conductor shaft 820 forwardly into closed position to provide electrical metallic contact of the central point 824 with the power line 800, as shown in the drawing. Rotation of the bolt 830 is facilitated by a raised low-friction boss 834 on the underside of conductor plate 826.

When the conductor plate is moved to a closed position as shown by arrow 846, the insulated arm 840 has a lower leg 842 abutting an end 844 of the conductor plate 825 in order to eliminate an initial installation gap. When the coupler device is in open position as shown in phantom at 848, the initial installation gap allows insertion of the power line 800 inside of the U-shaped insulated arm. The upper part of the U-shaped insulated arm 840 provides a recess for holding the coupler device in self-supporting position on the power line 800.

In view of all the foregoing, it will be understood by those skilled in the art that various embodiments of the invention enable and facilitate implementation of a broadband communication system on energized power lines by various installation methods including but not limited to one or more of the following techniques: making multiple connections to power lines through individual coupler devices in order to bypass transformers connecting LV customer premises to shared power lines; or making multiple connections to power lines through wireless transceivers in order to connect customer premises to shared power lines; or making multiple connections to power lines through capacitive coupler devices in order to connect customer premises to shared power lines; or connecting repeater electronics to MV power lines in order to facilitate broadband signal transmission on shared power lines to customer premises; or connecting routers to LV or MV power lines in order to direct delivery of data messages to appropriate customer premises.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

The invention claimed is:

1. A method to facilitate broadband electrical transmissions on a power line, comprising:
   placing a coupler device on an energized power line in a self-supporting position; holding the coupler device in said self-supporting position with an insulated coupler arm,
   engaging the coupler device from a location spaced apart from the energized power line to cause a conductive portion of the coupler device to make electrical contact with the power line by moving the conductive portion from a retracted position seperated from the power line to an advanced position with a manually actived insulated toll that engages the conductive portion; and
   transmitting data signals through the coupler device via the energized power line.

2. The method of claim 1 which comprises transmitting data signals to and from customer premises through the coupler device via the energized power line.

3. The method of claim 1 which comprises transmitting data signals to and from repeaters through the coupler device via the energized power line.

4. The method of claim 1 which further includes connecting the conductive portion to a signal line through a capacitor.

5. The method of claim 1 which further includes making multiple connections through respective individual coupler devices to power lines in order to provide broadband communication links to a plurality of customer premises via shared power lines.

6. The method of claim 1 which further comprises one or more of the following:
   making multiple connections to power lines through respective individual coupler devices in order to bypass transformers connecting LV customer premises to shared power lines; or
   making multiple connections to power lines through respective wireless transceivers in order to connect customer premises to shared power lines; or
   making multiple connections to power lines through respective capacitive coupler devices in order to connect customer premises to shared power lines; or
   connecting repeater electronics to MV power lines in order to facilitate broadband signal transmission on shared power lines to customer premises; or connecting routers to LV or MV power lines in order to direct delivery of data messages to appropriate customer premises.

7. A power line broadband communication system comprising:
   a power transmission line carrying AC or DC power to multiple customer premises;
   one or more broadband signal lines respectively connected to said multiple customer premises; and
   a coupler device connecting said one or more broadband signal lines with said power transmission line through a conductive portion of the coupler device, said conductive portion movable from a non-conducting retracted position spaced apart from said power transmission line to a forward conducting position in electrical contact with said power transmission line; wherein said coupler device comprises an insulated arm to hold the coupler device in wherein said insulated arm a supporting position on said power transmission line; and comprise a hook-shaped end resting on said power transmission line.

8. The communication system of claim 7 wherein said conductive portion is movable from the non-conducting retracted position by a manually activated insulated tool sized and shaped to engage said conductive portion.

9. The communication system of claim 7 wherein said coupler device is connected to said one or more broadband signal lines through a capacitor.

10. The communication system of claim 7 which further comprises an additional coupler means with a conductive portion movable from a non-conducting retracted position spaced apart from said power transmission line to a forward conducting position for making electrical contact with said power transmission line.

11. The communication system of claim 7 further comprising additional coupler means for the making one or more of the following coupler connections:
   a bypassing connection to power lines in order to bypass transformers; or
   a capacitive coupler connection to one or more of said multiple customer premises; or
   a wireless transceiver connection to one or more of said multiple customer premises; or
   a signal repeater connection to power lines in order to maintain continued transmission of broadband signals; or
   a router connection to power lines in order to direct delivery of data messages to appropriate customer premises.

12. The communication system of claim 11 wherein said additional coupler means provide coupler connections to MV and/or LV power lines.

13. A broadband coupler for making electrical connection to a power line communication system comprising:
   an insulated arm with a first end to make supportable contact with a power line, and a second end having a conductor portion;
   adjustment means allowing said conductor portion to move relative to said insulated arm; and
   a base on said conductor portion capable of being engaged by a remotely activated tool to move said conductor portion from a retracted non-conducting position separated from said power line to a conducting position making electrical contact with said power line.

14. The broadband coupler of claim 13 wherein said second end comprises a recess for at least partially engaging said power line.

15. The broadband coupler of claim 13 wherein said adjustment means comprises an adjustment screw.

16. The broadband coupler of claim 15 wherein said adjustment screw comprises part of said conductor portion.

17. The broadband coupler of claim 15 wherein said adjustment screw is movable from a retracted non-conducting position separated from said power line to a conducting position making electrical contact with said power line.

18. The broadband coupler of claim 13 wherein said adjustment means comprises attachment means for securely holding the coupler on the power line after said conductor portion has moved from said retracted non-conducting position to said conducting position.

19. The broadband coupler of claim 18 wherein said attachment means comprises a movable shaft on said conductor portion, said movable shaft having a sharpened apex making metallic electrical contact with said power line by moving forwardly to said conducting position.

20. The broadband coupler of claim 18 wherein said first end of said insulated arm comprises a U-shaped end at least partially surrounding said power line, and said attachment means comprises a movable shaft on said conductor portion having a sharpened apex making metallic electrical contact with said power line in a direction that helps to maintain such contact by holding said power line against said U-shaped end when said conductor portion is moved to said conduction position.

21. The broadband coupler of claim 20 wherein said movable shaft makes metallic electrical contact with said power line in one of the following said directions: approximately vertical, approximately horizontal, primarily vertical, primarily horizontal, a direction having both vertical and horizontal components.

22. The broadband coupler of claim 18 wherein said attachment means comprises a second end movable between an open and closed position, and an adjustment screw engageable by a remotely activated tool capable of moving said second end.

23. The broadband coupler of claim 13 wherein said conductor portion is connected through a signal line to a capacitor.

24. The broadband coupler of claim 13 wherein said conductor portion is connected to one of the following electronic signal components: capacitor, transformer bypass, router, repeater, wireless transceiver.

25. The broadband coupler of claim 13 wherein the coupler provides electrical metallic interconnections with MV or LV power lines.

26. A coupler for making electrical connection to an energized power line to enable broadband communications on the energized power line, said coupler comprising:
   an insulated portion to make supportable contact with the energized power line;
   a conductor portion;
   an adjustment member that causes said conductor portion to move relative to the power line while said insulated portion remains in supportable contact with the power line; and
   a base on said conductor portion capable of being engaged by a remotely activated tool to move said conductor portion from a retracted non-conducting position separated from the power line to a conducting position making electrical contact with said power line.

27. The coupler of claim 26 wherein said adjustment member comprises an adjustment screw engageable by the remotely activated tool.

28. The coupler of claim 27 wherein the adjustment screw is incorporated as part of said conductor portion.

29. The coupler of claim 27 wherein the adjustment screw is incorporated as part of said insulated portion.

30. The coupler of claim 26 wherein said conductor portion is connected to one of the following signal components: capacitor, transformer bypass, router, repeater, wireless transceiver.

31. The coupler of claim 26 wherein said insulated portion comprises a U-shaped hook for holding the coupler in self-supporting position on the power line.

32. The coupler of claim 26 wherein said insulated portion comprises multiple interior contact surfaces for holding the coupler in self-supporting position on the power line.

33. The coupler of claim 26 wherein said insulated portion comprises an arm for holding the coupler in self-supporting position on the power line.

34. The coupler of claim 26 wherein said conductor portion comprises a head having an apex defining points or edges that make electrical contact with the power line when said conductor portion is moved from said retracted position to said conducting position.

* * * * *